United States Patent [19]

Larson et al.

[11] 4,079,452
[45] Mar. 14, 1978

[54] PROGRAMMABLE CONTROLLER WITH MODULAR FIRMWARE FOR COMMUNICATION CONTROL

[75] Inventors: Kenneth Norman Larson, Thousand Oaks; Alfred Dale Scarbrough, Northridge; John Bernard Knueven, Simi, all of Calif.

[73] Assignee: Bunker Ramo Corporation, Oak Brook, Ill.

[21] Appl. No.: 696,500

[22] Filed: Jun. 15, 1976

[51] Int. Cl.$^2$ .............................................. G06F 3/04
[52] U.S. Cl. ..................................... 364/200; 364/900
[58] Field of Search .................... 445/1; 340/172.5; 364/200 MS, 900 MS

[56] References Cited

U.S. PATENT DOCUMENTS

| | | | |
|---|---|---|---|
| 3,409,880 | 11/1968 | Galler et al. | 340/172.5 |
| 3,810,105 | 5/1974 | England | 340/172.5 |
| 3,820,079 | 6/1974 | Bergh et al. | 340/172.5 |
| 3,828,325 | 8/1974 | Stafford et al. | 340/172.5 |
| 3,842,405 | 10/1974 | Key et al. | 340/172.5 |

*Primary Examiner*—Mark E. Nusbaum

*Attorney, Agent, or Firm*—F. M. Arbuckle; A. Freilich

[57] ABSTRACT

A programmable controller module (PCM) for operably coupling a plurality of peripheral devices (PDs) of various communication disciplines to a data processor (DP) or to remote PCMs through a serial interface adapter (SIA) or parallel interface adapter (PIA). The PCM is comprised of a special purpose computer having a program of subroutines arranged in memory modules which define and implement specific communication protocols (routines) for different communication disciplines. Each PD connected to a PCM by an SIA or PIA is assigned a channel code and is addressed by channel code. A discipline identification (DID) line is connected from each adapter channel to one of a predetermined number of terminals in the PCM. There is one terminal for each communication discipline for which there is stored in a memory module an appropriate protocol. Each channel has its DID line connected to the appropriate terminal according to the communication discipline of the PD connected to it. When a channel is addressed, its DID is activated. The PCM then scans the terminals to determine which is activated to ascertain the discipline of the device.

12 Claims, 6 Drawing Figures

PROGRAMMABLE CONTROLLER WITH MODULAR FIRMWARE FOR COMMUNICATION CONTROL

BACKGROUND OF THE INVENTION

This invention relates generally to digital computer data management systems, and more particularly to improvements in a programmable controller module for facilitating communication between peripheral devices employing different communication disciplines, and between such devices and a data processor.

In almost all data management systems, a controller is designed to accomodate only peripheral devices having a common communication discipline. To accomodate a plurality of peripheral devices of different disciplines, it is necessary to provide a controller of different design for each communication discipline. In typical data management systems, there may be over six types of major network communication disciplines and a multitude of communication disciplines for specialized peripheral devices and terminals. The term "communication discipline" is defined as the protocal or set of rules governing the message format utilized by a particular network, peripheral device or terminal. Exemplary factors distinguishing one discipline from another involve, for example, synchronization, start and end of transfer sequence, message segment length, etc. Each type of discipline requires a different data handling protocol. The term "protocol" is defined as the programmed procedure for inputing and outputing data to and from a network peripheral device or terminal according to the discipline of the data. The following list comprises only a small portion of those disciplines which may be of interest in a typical data management system.

| | COMMUNICATION DISCIPLINE |
|---|---|
| VIP | VISUAL IMAGE PROJECTION TERMINAL (HONEYWELL) |
| DN355 | DATA-NET 355 (HONEYWELL) |
| BAUDOT TTY | ITA NO. 2 TELETYPEWRITER |
| ASCII TTY | ASCII TELETYPEWRITER ODD OR EVEN PARITY |
| PT-PT BISYNCH | POINT-TO-POINT BINARY SYNCHRONOUS |
| RLP300 | REMOTE LINE PRINTER 300 (HONEYWELL) |
| GENSER | AUTODIN GENERAL SERVICE PORT |
| WUPTC | WESTERN UNION PROGRAMMABLE TERMINAL CONTROLLER (AUTODIN) |
| DN30 | DATA-NET 30 (HONEYWELL) |
| DACOM | DACOM FACSIMILE UNIT |
| 188C TTY | MILITARY TELETYPEWRITER |
| DP 2910 | DATA PRODUCTS 2910 MIL/ TEMPEST LINE PRINTER |
| D900A | VERSATEC PRINTER/PLOTTER |
| DDCMP | DIGITAL EQUIPMENT CORPORATION DDCMP |

A communication control unit Model BR 1569 manufactured by the Bunker Ramo Corporation employs a programmable controller module for interconnecting peripheral devices of different disciplines to each other and to a data processor comprised of a bus organized central processing unit and a main memory. The complete control unit is described in an application Ser. No. 629,510 filed Nov. 6, 1975, titled "Communication Control Unit." As originally conceived, the Model BR1569 control unit contains firmware in a read-only memory (ROM) of a programmable controller module (PCM) which defines and implements a specific communication protocol for each of 16 channels. A typical system implements three to four protocols with a number of channels assigned to each protocol. A basic problem with that arrangement was that completely new firmware (software entered into a ROM) had to be assembled, delivered and installed each time there was a new channel assignment or a new protocol added.

OBJECTS AND SUMMARY OF THE INVENTION

An object of this invention is to provide some identification of the discipline of each peripheral device connected to each channel serviced by a programmed controller module in order for the appropriate protocol to be used, and to provide the protocols for the different disciplines in separate modules which can be added or deleted as the requirements of the system dictate.

Briefly, in accordance with an exemplary embodiment of the invention, a communication control unit is provided with a programmable controller module (PCM) containing a modular read-only memory (ROM) for storing a control program in two levels, a first level stored in a predetermined number of ROM modules (typically one or two ROM modules) which contains control routines for servicing a number of different channels, and a second level which contains discipline dependent routines to be used for the different devices in separate ROM modules with all routines (protocol) for a specific discipline in one module, i.e., with a separate module for each protocol.

Each communication channel to be controlled by the PCM is dedicated to a peripheral device of a particular communication discipline by connecting from it a discipline identification (DID) line to one of a predetermined number, N, of input terminals to the PCM. Each input terminal thus connected to receive a DID signal is scanned whenever a channel is found requesting service as the PCM routinely addresses the channels under programmed control. The discipline of the peripheral device assigned to a channel is thus determined each time it is selected by the PCM under programmed control. Once the discipline of a device is determined under first level programmed control, the first level control program branches to the appropriate one of a plurality of second level control programs in which the necessary protocol is stored for the identified discipline. The protocol is totally contained within a ROM module which is preprogrammed before the ROM module is installed. A protocol ROM may be installed in any address position of the PCM program memory; its position is correlated with the terminals connected to the DID lines by the first level program.

Instruction sequencing is effected by a PCM address counter. Each jump instruction in a protocol is restricted to addresses within the ROM module dedicated to the protocol until the last instruction of the protocol is reached. The last instruction is a direct (full address) jump instruction to a location in the first level control program. In that manner, up to N protocols may be added and associated with the N terminals of the PCM. All peripheral devices requiring a specific protocol have their DID signal lines connected to the same terminal. The DID signal line for a specific peripheral device is activated when the channel to which it is connected is addressed by the PCM.

The novel features of the invention are set forth with particularity in the appended claims. The invention will

DESCRIPTION OF PREFERRED EMBODIMENTS

Figure 1:
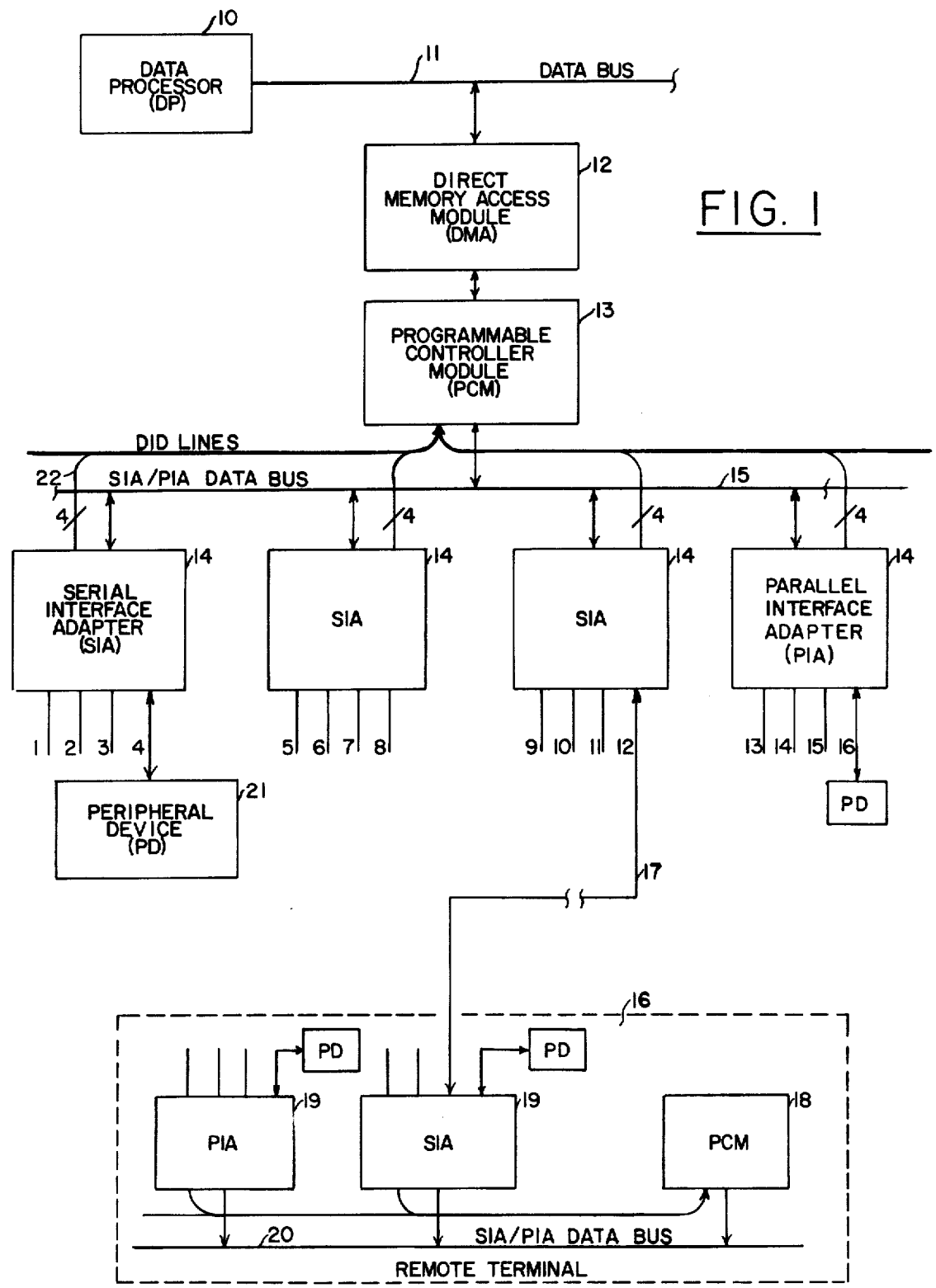
FIG. 1 is a block diagram of a data processing system incorporating a communication control unit in accordance with the present invention.

Attention is initially directed to FIG. 1 which depicts in block form a data processing system incorporating a communication control unit in accordance with the aforesaid copending application. The system is comprised of a data processor 10 which includes a programmed digital computer and a main memory. The computer is bus oriented and therefore includes a data bus 11 for data input and output to peripheral devices. The system further includes at least one, and sometimes two, direct memory access modules (DMA) 12, a programmable controller module (PCM) 13 for each DMA and typically one to four serial and/or parallel interface adaptors (SIA and/or PIA) 14 connected to the PCM through an SIA/PIA DATA bus 15.

The DMA connects to the data bus and can therefore receive data, addresses and control signals from the data processor and send data, addresses and control signals to the data processor in 16 bit words.

The PCM is a programmable controller that receives and sends addresses, data and commands from and to the DMA in 8-bit bytes or characters. After processing the data or commands, the PCM performs required functions and sends or receives 8-bit data or commands to or from an addressed SIA or PIA via the I/O bus. The addressed SIA converts the 8-bit data character to serial data, with code conversion if required, for transmission to an appropriate one of four channels or receives the serial data and converts it to parallel 8-bit data, with code conversion if required, on receiving. The addressed PIA converts the PCM 8-bit data and control characters into parallel signals compatible with the peripheral device, and converts data and status signals from the peripheral device into a form compatible with the PCM.

Each SIA or PIA is coupled to four separate channels each of which may connect to a peripheral device, such as a CRT terminal, line printer, teletypewriter, etc. Although a single communication control unit can interface with up to thirty-two channels, using two DMAs for simplicity in explanation herein, the invention will be described with reference to a 16 channel unit including one DMA and one PCM.

As depicted in FIG. 1, one of the SIA channels may be connected to a remote terminal 16 via an appropriate data line 17 as a "peripheral unit" which is itself comprised of a PCM 18 and PIAs and SIAs 19 interconnected through SIA/PIA DATAbus 20. The PCM 18 is very similar to the PCM 13, and may be identical. In that regard, the PCM 18 may also be connected to a data processor by a DMA and data bus, but since the PCM 18, like the PCM 13, is in fact a microprogrammed computer, the remote terminal 16 may function alone and communicate with the communication control unit from which it receives data as a peripheral device having a predetermined and specified communication discipline.

Each SIA or PIA provides its PCM with up to four channels, and each channel may be connected to any one of a plurality of different types of peripheral devices having any one of eight communication disciplines, such as a peripheral device (PD) 21. Each channel produces a signal over one wire which identifies its peripheral device. For example, when the device 21 connected to channel 4 is addressed by the PCM 13 via the bus 15, channel 4 transmits a signal over a unique one of four wires in a cable 22. The other end of the wire is connected to one of eight terminals (ports) of the PCM according to the discipline of the device. For example, assuming terminal No. 3 of the eight terminals numbered 1 through 8 is reserved for ASCII-TTY devices, and that the device 21 is of such a communication discipline, the associated wire within the SIA is connected to the terminal No. 3. Consequently, when channel 4 is addressed, a signal is transmitted over that wire to the terminal No. 3. The PCM then scans the terminals to determine which has a signal and in that manner ascertains that channel 4 which has just been addressed has connected to it an ASCII-TTY device. As a consequence of that, the PCM will branch to a modular ROM in its program memory wherein a suitable program is stored for receiving data from or transmitting data to the peripheral device according to the ASCII-TTY discipline. Thus, in accordance with an exemplary embodiment of the invention, the system may be initially assembled with from one to seven protocols (programs) for up to seven different disciplines, each assigned addresses corresponding to the terminal numbers. For example, the ASCII-TTY protocol would be assigned the octal address 3. (The eighth terminal is not used.) All ASCII-TTY devices connected at the time of initial installation, and all other ASCII-TTY devices thereafter added in any channel, will have its discipline identification signal line connected to the same terminal No. 3.

An advantage of the present invention is that when a system is installed, only a few (for example 3) modular ROMs may be required, each with a different protocol for the different PDs. In that event, only terminals 1, 2 and 3 would be used and the modular ROMs would be assigned octal addresses 1, 2 and 3. Thereafter, if it becomes necessary to add peripheral devices of fourth and fifth types of communication disciplines, it would be a simple matter to add fourth and fifth modular ROMs with appropriate protocols preprogrammed, and to assign them the addresses of terminals Nos. 4 and 5 by virtue of their physical location within the PCM. In addition, terminal assignments could be easily changed. The individual ROMs preprogrammed with various protocols could be assembled and placed in inventory. This would give the user the opportunity to order on short notice any protocol ROM which can easily be plugged into unused ROM module locations in the PCM without any change in previously installed protocol ROMs. The only limitation to this concept is that each protocol program must fit into the modular ROMs which must all be of the same size. However, this limitation is not restrictive since experience has shown that each of the standard disciplines require protocols that will fit economically into a 256 word ROM module.

Before proceeding with a more detailed description of the present invention, the organization of the PCM disclosed in the aforesaid copending application will be briefly described with reference to FIG. 2. But first it is appropriate to review the requirements of the DMA on the bus 11.

First, the information to be sent or received either resides in or will be stored in the main memory of the data processor 10. Secondly, control of the bus is at all times maintained by the data processor. Thus, any DMA on the bus uses either a Data (IN) or Data (OUT) command followed by the necessary data and address locations to transfer data into or out of that memory. For example, when the system is transmitting data to a peripheral device and needs data from memory to do so, the DMA obtains the bus from the data processor via a non-processor request (NPR) and issues:

(1) Data (OUT) command (2) The starting address in memory. The DMA then receives a sixteen-bit data word from memory. As each sixteen-bit word is received by the DMA, it is buffered in memory in the PCM in eight-bit bytes (characters). The characters are then sent to the appropriate SIA or PIA by the PCM for transmittal to the peripheral device. The DMA is then directed by the PCM to fetch another word from core via an NPR.

On the other hand, when the system is receiving data from a peripheral device and needs to store data in memory, the DMA must provide:

(1) Data (IN) command (2) The starting address in core memory. The DMA then sends the sixteen-bit data word to memory. The process is similar but reversed when the system is sending data to memory.

Figure 2:
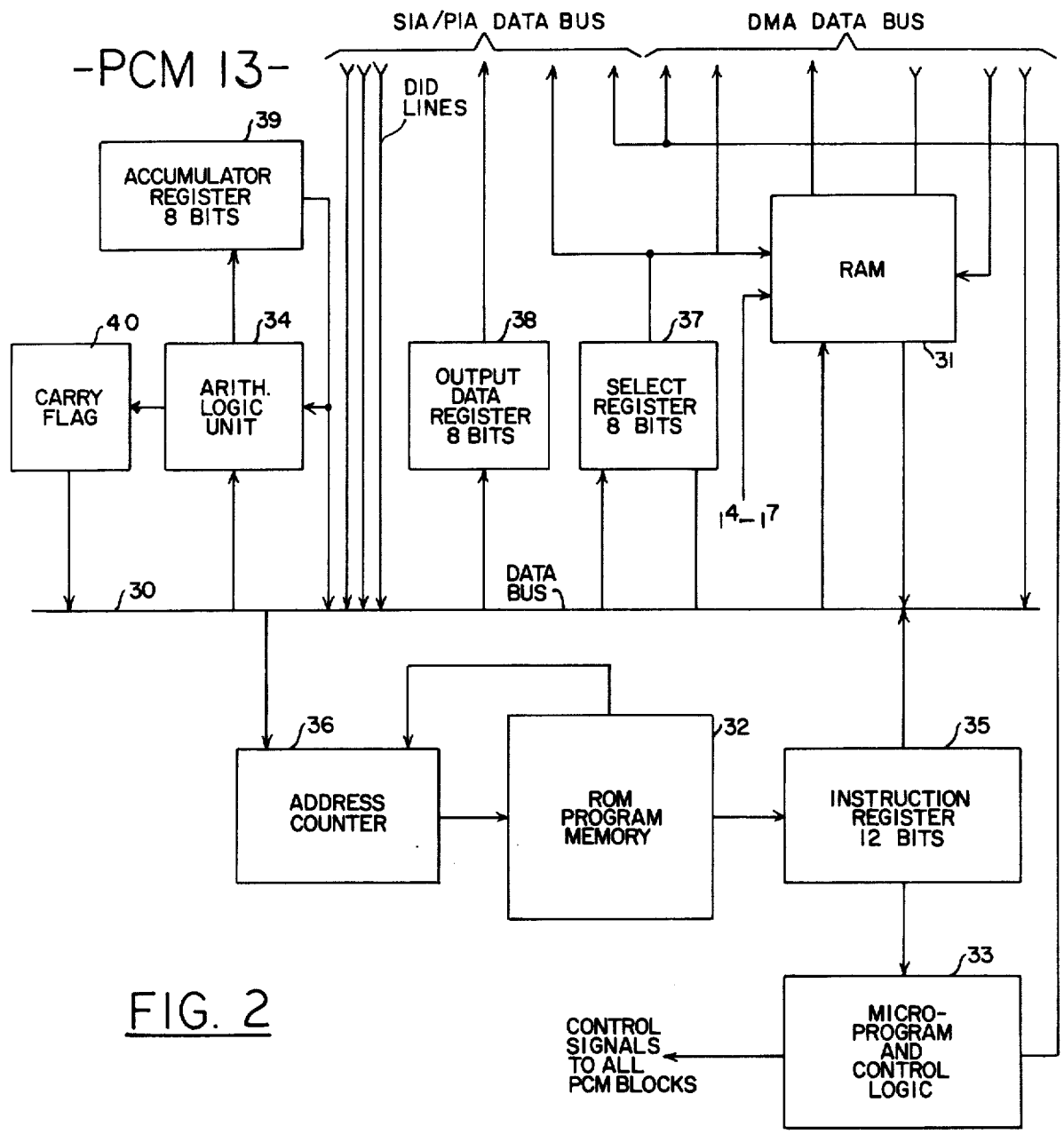
FIG. 2 is a block diagram of a programmable control module (PCM) shown in FIG. 1.

Attention is now called to FIG. 2 which illustrates the programmable controller module (PCM) in significantly greater detail than its block representation FIG. 1. The PCM is a small programmable parallel computer whose organization has been optimized for the communication control function. As can be seen in FIG. 2, the PCM is comprised of a plurality of blocks or elements all of which communicate with each other via an internal data bus 30. Each of the PCM elements will be described in detail hereinafter.

Prior to describing the PCM elements separately, the overall characteristics of the PCM will be discussed and the instruction set considered. As noted, the PCM comprises an efficient programmable parallel computer. It utilizes a data word length of 8 bits, while the instruction and address is 12 bits in length.

The PCM is a microprogrammable processor with a single data bus, arithmetic logic unit and a dual ported 512-word (expandable) random access memory (RAM) 31 that is addressable by the PCM data source or the DMA for variable data. A control program is stored in a programmable read-only (ROM) memory 32 typically comprised of 2048 words (eight modules of 256-word ROMs). Microprogram instructions are stored in a separate programmable read-only memory 33, as will be discussed. An arithmetic logic unit 34 provides the capability for the logical and arithmetic functions required. Instructions read from the ROM program memory 32 are executed in a maximum of three or four states, depending upon whether or not the RAM memory 31 is to be addressed, and depending upon the particular ROM command to be executed.

With the foregoing overview of the PCM in mind, the various elements of the PCM will now be considered in greater detail. The programmable read-only memory 32 stores in one ROM module a sequence of instructions forming control routines applicable to all peripheral devices, and in additional ROM modules character transmit/receive protocols, each protocol applicable to a particular communication discipline used by one or more of the connected peripheral devices. Instructions read out of the program memory 32 are parallel loaded into an instruction register 35 at the beginning of each instruction execution cycle. Decoding and control of instruction execution is performed by the microprogram and control logic 33.

The microprogram and control logic 33 includes a 256 × 12 bit read-only memory which stores the microprogram. The microprogram generates/enables control register loading, address incrementing, memory writing, and command generation. The microprogram also controls the arithmetic logic unit 34 and selects data sources. The inputs to the microprogram are the opcode part of the instruction (bits 8-11) in register 35, the bit condition selector, and the compare output of the arithmetic/logic unit 34. An edge triggered register is used to synchronize the bit condition and compare inputs and to sequence through the states of the microprogram.

Instructions read from the program memory 32 are selected by an address counter 36. The address counter is 12 bits in length allowing it to address an expanded program memory of 4096 words. The address counter is incremented each time the instruction register 35 is loaded and during a jump instruction if the specified condition is not satisfied. The address counter 36 is parallel loaded during a jump instruction if the specified condition is satisfied.

Data is written into the random access memory 31 during a transfer instruction in which one of its memory cells is defined as the data sink. Data is read from that memory during a transfer instruction in which one of its memory cells is defined as the data source. Memory consists of two sections, each section containing 256 8-bit characters. The sections consist of 1-bit × 256-bit random access memories operated in parallel to form an 8-bit × 256 character memory section. There is an external port into the memory 31 which can be used by the DMA, as aforementioned, to read or write into the memory 31 whenever the PCM is not using the memory 31. Accessing the memory is controlled by a select register 37. The select register may be used also to select a peripheral device to be serviced, via the SIA, by the PCM. The register 37 is loaded by means of a properly addressed load register or transfer instruction. The register may be read by the PCM during a transfer instruction in which it is specified as the data source.

An output data register 38 provides an output character which is to be read by the selected peripheral device, via the SIA. The selection of the device to read the output character is made by the select register 37. The output data character register may be loaded by means of a properly addressed load register or transfer instruction. The register may not be used as a data source by a transfer function. An I/O command is the means by which the PCM causes a function to be initiated in the selected peripheral device. The command is generated by means of an I/O command instruction.

Arithmetic is performed by the arithmetic logic unit 34 and an accumulator register 39. The arithmetic logic unit combines the contents of the accumulator and the specified data source according to the function specified by the instruction register contents. The results are placed in the accumulator register. The accumulator register is the primary operating register of the PCM. The results of all arithmetic and logic functions are placed in this register. A carry flag 40 is set when a carry out occurs during execution of an arithmetic instruction. A jump may use the status of the carry flag as the jump condition. The accumulator register may be loaded by a properly addressed load register or transfer instruction. The register may be read during a transfer instruction in which it is specified as the data source. Jump instructions may compare the accumulator with instruction, RAM, input, or other register data. From the discussion thus far, it should now be recognized that the PCM contains two read-only memories, i.e., the program memory 32 and the microprogram memory 33. The microprogram determines the instruction set of the PCM and may be changed to suit particular applications. The program memory stores the previously mentioned firmware which, as mentioned, consists of two levels. It will be recalled that level 1 of the firmware contains control programs common to all communication disciplines and level 2 of the firmware contains discipline dependent programs or protocols.

In executing each instruction loaded into the instruction register 35 from the program memory, two, three, or four states of the microprogram are required depending upon the complexity of the function to be performed. State zero is always used to load the instruction register and increment the address counter. The next state 1 is used for instruction decoding and to execute operations not requiring random access memory. During states two and three operations requiring random memory access may be executed. The firmware in the program memory enables the PCM to manipulate and transfer data between two or more devices, such as the data processor and a selected peripheral device.

The select register 37 provides the upper five bits of the RAM address for PDM instructions, thus a specific page of RAM is selected for each I/O device selected by the select register. During states 0 and 1 on the program, an external device may read or write into the RAM at any address of its choice. If this device is the DMA, the RAM may be used to store computer memory addresses, word counts, or other parameters required for DMA data transfers and interrupt generation. This external port into the RAM memory allows the data processor to load the RAM register or the PCM to execute DMA transfers without interrupting the firmware.

Data to be transferred from the PCM to a selected peripheral device is placed in the output data register 38. Then an I/O command is used to strobe the data into the device. Data to be transferred from a selected device to the PCM is loaded into the RAM memory 31, or a register, by a transfer instruction. Then an I/O may be used to acknowledge the data transfer. I/O commands may be used to initiate control functions also. Device status may be monitored by the PCM at the input ports without transferring the status to a register.

The DMA may read the memory transfer address from the RAM memory using the RAM DMA port when a read or write command is received from the PCM. The data to be read or written is stored in RAM. After the data transfer is completed, the DMA will update the memory transfer address and return it to the RAM memory. The PCM updates and tests the word count. The DMA generates end of transfer interrupts when the PCM finds the word count equal to zero and sends a channel interrupt I/O command to the DMA. The DMA provides status to the PCM using an input port.

In the PCM, each channel is scanned sequentially by the first level program. High-speed channels may be scanned more frequently by performing a nonsequential or weighted scan.

Figure 3:
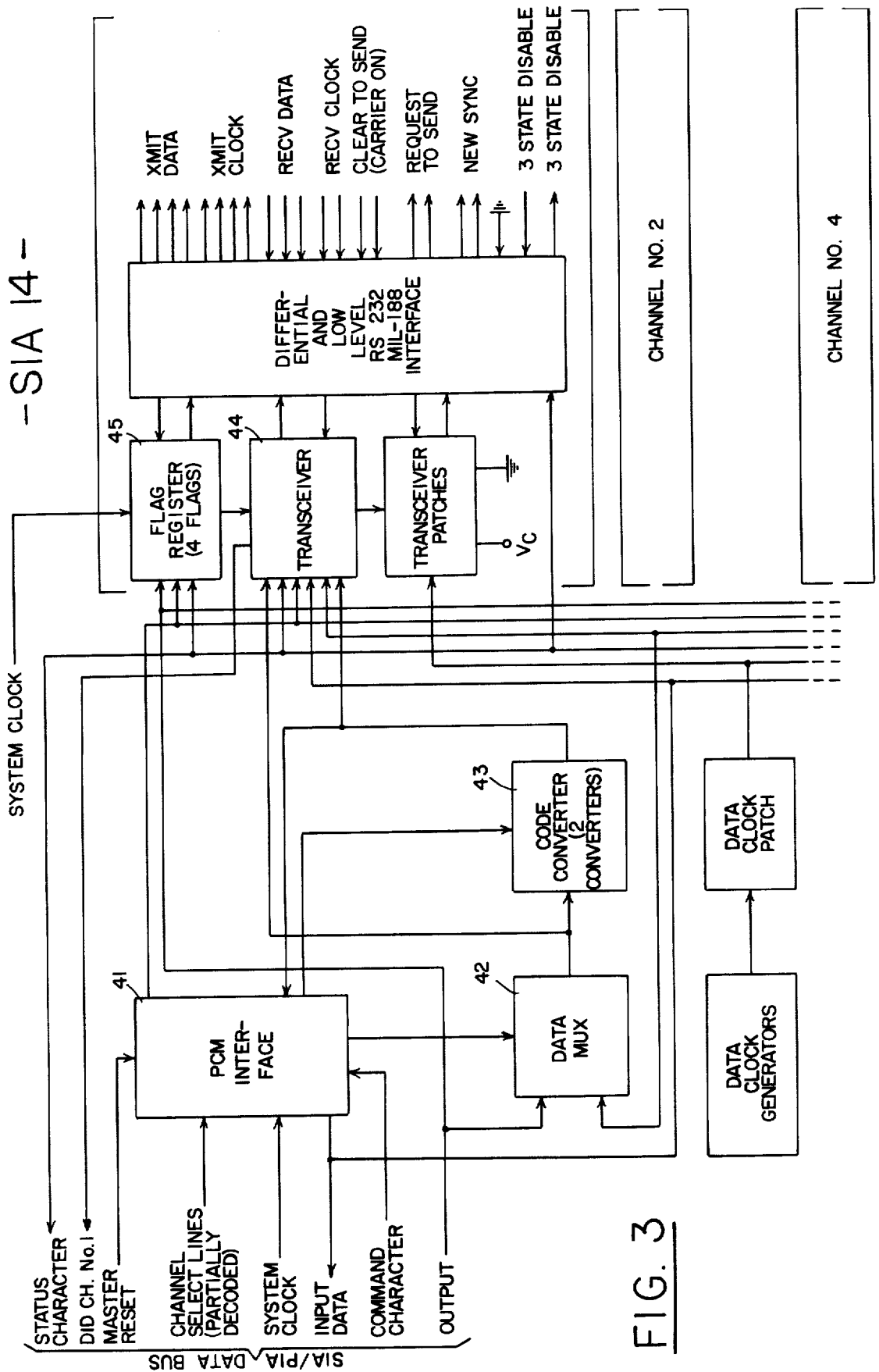
FIG. 3 is a block diagram of a serial interface adapter module (SIA) shown in FIG. 1.

Prior to describing the implementation of the firmware in accordance with the present invention, the SIA module, depicted in FIG. 3, will be described in general. As previously mentioned, each SIA module comprises a flexible serial communication interface providing a wide range of capabilities in terms of baud rates, communication modes, interface levels, character length, and code conversion. The basic function of the SIA is to convert parallel data to serial data for transmission data to a selected peripheral device and to convert serial data into parallel data on receiving information from a peripheral device. Each SIA module contains four full duplex communication channels and includes a PCM interface block 41 which functions to decode the PCM commands and select register addresses. The PCM commands the SIA via an I/O command. As noted with reference to FIG. 1, in this exemplary embodiment, the PCM is capable of interfacing with four SIA modules, only one of which is illustrated in FIG. 3.

Figure 4:
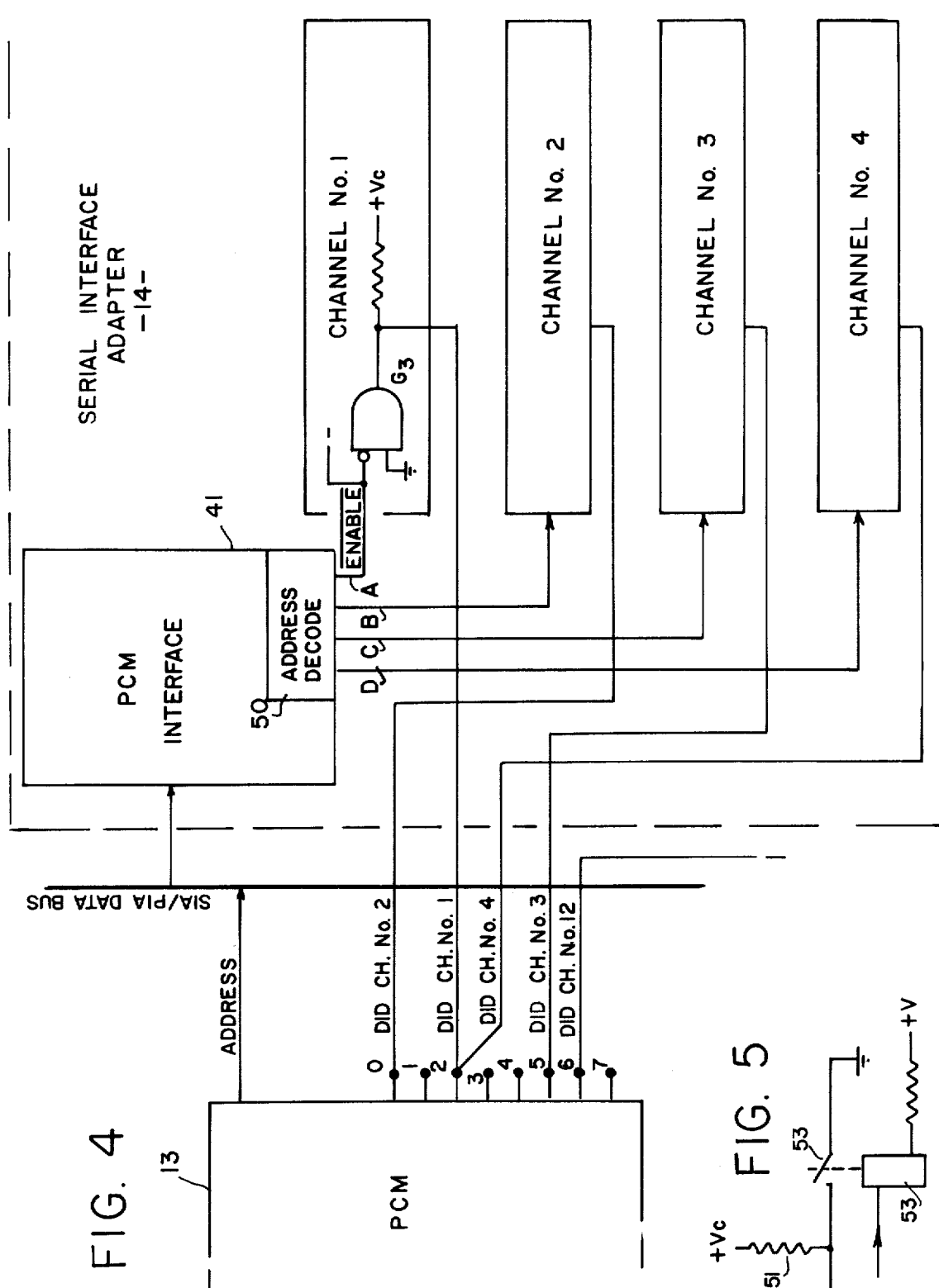
FIG. 4 is a schematic diagram illustrating the manner in which a discipline identification (DID) line connected to one of the DID terminals in a PCM is activated in an SIA when one of its channels is addressed by the PCM.

Since each SIA module provides four full duplex channels to peripheral devices, a PCM with four SIA modules coupled thereto can interface with sixteen full duplex channels. The PCM interface module 41 also decodes channel select addresses. Data is sent to the SIA output channels via I/O commands and transfer commands. The output data is sent to a data multiplexor 42 which by-passes a code converter 43, if necessary. An I/O command loads this data into a transceiver 44. On receiving, the input data channel is selected by the multiplexor 42, by-passes the code converter if necessary, and data is sent to the interface module 41 as an input to the PCM. The input data lines are buffered for four SIA modules. Therefore, no SIA places data on the input lines until it has been addressed. Each SIA can be interrogated to determine its status as indicated by bits of a status character. Each bit is set in accordance with the particular status of some part of the SIA. In addition to the status character, an addressed channel of an SIA transmits a discipline identification (DID) signal to the PCM. The DID signal line for channel 1 is shown individually in FIG. 4. It should be understood that each channel has its own DID signal line to the PCM. Together the four DID signal lines from an SIA to the PDM comprise the cable 22 shown in FIG. 1.

The sole function of the DID signal transmitted by an addressed SIA channel is to drive one of N (for example 8) terminals of the PCM to which it is connected to a logic 0 (0 volt level) when the channel is addressed. Each of the N terminals, numbered 1-8 in an exemplary embodiment is preassigned to a particular communication discipline, such as the ASCII-TTY discipline. When a particular SIA channel is dedicated to a peripheral device, the DID signal line of that channel is connected at the PCM to the terminal assigned to the discipline of that peripheral device. Each time the PCM addresses the channel, it scans the terminals to determine which one is at the logic 0 level, and thus determine the discipline of the peripheral device. Once that determination is made, the PCM jumps to the service routine (protocol) of the device in one of the modular ROMs. For example, if channel 4 is addressed, and upon scanning the terminals it is found that terminal No. 3 is at the logic 0 level, the PCM branches to the modular ROM having an address corresponding to the appropriate protocol. That address could be octal 3 for consistency, but it is not necessary that the numbers of the terminals correspond to the numbers of the modular ROMs since the proper modular ROM can be matched to the terminal at the logic 0 level by the PCM program.

The code convertor 43 consists of two read-only memories for transmit and two read-only memories for receive. The PCM data character or the SIA receive character is used as an address to the ROM location which contains a converted character.

Each SIA channel contains a flag register 45 and time out circuitry that holds: request to send, new sync, disable sister channel, and sync search enable. Each SIA channel further contains line driver and receiver circuits 46 to interface with the required output or input characteristics of the peripheral devices to be connected to the SIA output channels.

The foregoing description generally defines the significant structural and functional aspects of the serial interface adapter (SIA) module implemented with a DID signal line in accordance with the present invention. The preferred implementation will now be described in greater detail with reference to FIG. 4. A decoder 50 in the PCM interface 41 receives five bits of a partially decoded channel address to produce an enable signal on one of four lines A, B, C and D (also shows schematically in FIG. 1 as cable 22) associated with the first, second, third and fourth channels of the SIA.

Figure 5:
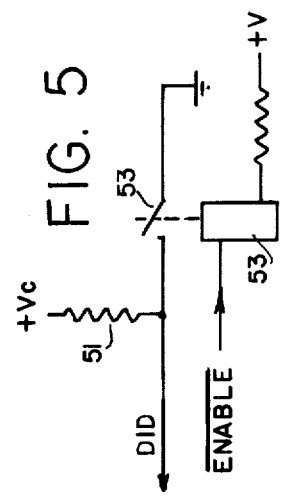
FIG. 5 is a diagram of a relay switch that is equivalent to a three-state activating gate in FIG. 4.

The enable signal thus generated in the PCM interface is transmitted in inverted form over one of four lines to a "three-state" or "open collector" gate $G_3$ in the channel selected. Each of the gates is a positive-NAND gate which produces a discipline identification signal DID in response to the inverted enable signal (ENABLE). For each channel, the gate $G_3$ thus provides a discipline identification signal, over a line DID because the enable signal is connected to the operative control terminal of the gate such that the output is off (disabled) when the operative control is high. When the output is off, a pull-up resistor 51 maintains the DID line high ($+V_c$). An activated DID line is thus low (logic 0). This arrangement of a three-state or open collector gate having its operative control terminal connected to receive the channel enable signal and having its data terminal connected to a logic 0 source (circuit ground) allows more than one DID line to be connected to one terminal of the PCM such that any one gate can drive the terminal to a low level (circuit ground). It is thus evident that a gate as used here is equivalent to a relay circuit connected as shown in FIG. 5 with its solenoid 52 energized by signal ENABLE to close a contact 53 when the signal ENABLE is present. Any one of any number of relays thus energized can pull down the terminal in the PCM to which the DID line is connected without affecting any other line.

There is a separate DID signal line for each channel. Each signal line is connected to one of a number of terminals of the PCM according to the discipline of the peripheral device connected to the channel. When a particular channel is selected, its gate $G_3$ will drive the line low (logic 0 level). The PCM then scans for the terminal that is driven low by a DID line to determine the discipline of the peripheral device connected to the channel of the active DID line. Only one DID line will be active at any one time because it is activated only as a result of the associated channel being addressed.

In the present exemplary embodiment of the invention, a 12-bit address is employed to address a control program in a module of the ROM program memory 32 (FIG. 2). A subroutine of the control program scans the terminals Nos. 0 through 7 to which the DID lines of the SIA or PIA channels are connected to determine the discipline of the peripheral device connected to an addressed channel. Once the terminal that is at a low level is found, the subroutine jumps to a starting address for the appropriate one of a plurality of ROM modules in which the protocol is stored for the particular type of peripheral device associated with the terminal found to be at a low level. For example, assuming the control subroutine is stored in one 256-word ROM, and that there are a total of eight possible 256-word ROMs which can be included, each as a separate plug-in module, the 12-bit address word may employ the least significant eight bits (bit positions 0 through 7) to address any one of 256 memory locations in a designated modular ROM, and the next three bits (positions 8, 9 and 10) to designate the ROM module. The last bit in position 11 is not required for addressing an 8 × 256 word memory. Bit 11 is used in this exemplary embodiment to lock the instruction sequencing in one of the protocol modules by programming all jump instructions in a protocol ROM with a logic 0 in bit position 11, except for the final jump instruction at the end of a protocol used to jump back to the control program. A modular ROM storing the protocol for a particular peripheral device may thus be programmed with relative jump instructions so that it can be plugged into any one of the modular ROM positions, except the one, or two, reserved for the control subroutine.

When the control program is prepared, it will provide a direct jump to a specific (full) address for each of its N DID terminals. A modular protocol ROM may then be installed into any position other than the two reserved for the control program. Then as long as all the channels using that protocol have their DID lines connected to the PCM DID terminal corresponding to the location of that protocol ROM, the control program will always jump to the proper modular ROM by simply determining which of its DID terminals is at a low level. This permits having a large number of different ROM modules to be prepared and held in inventory, and permits each module to be plugged into any one of the possible ROM module positions except those reserved for the control routine.

Figure 6:
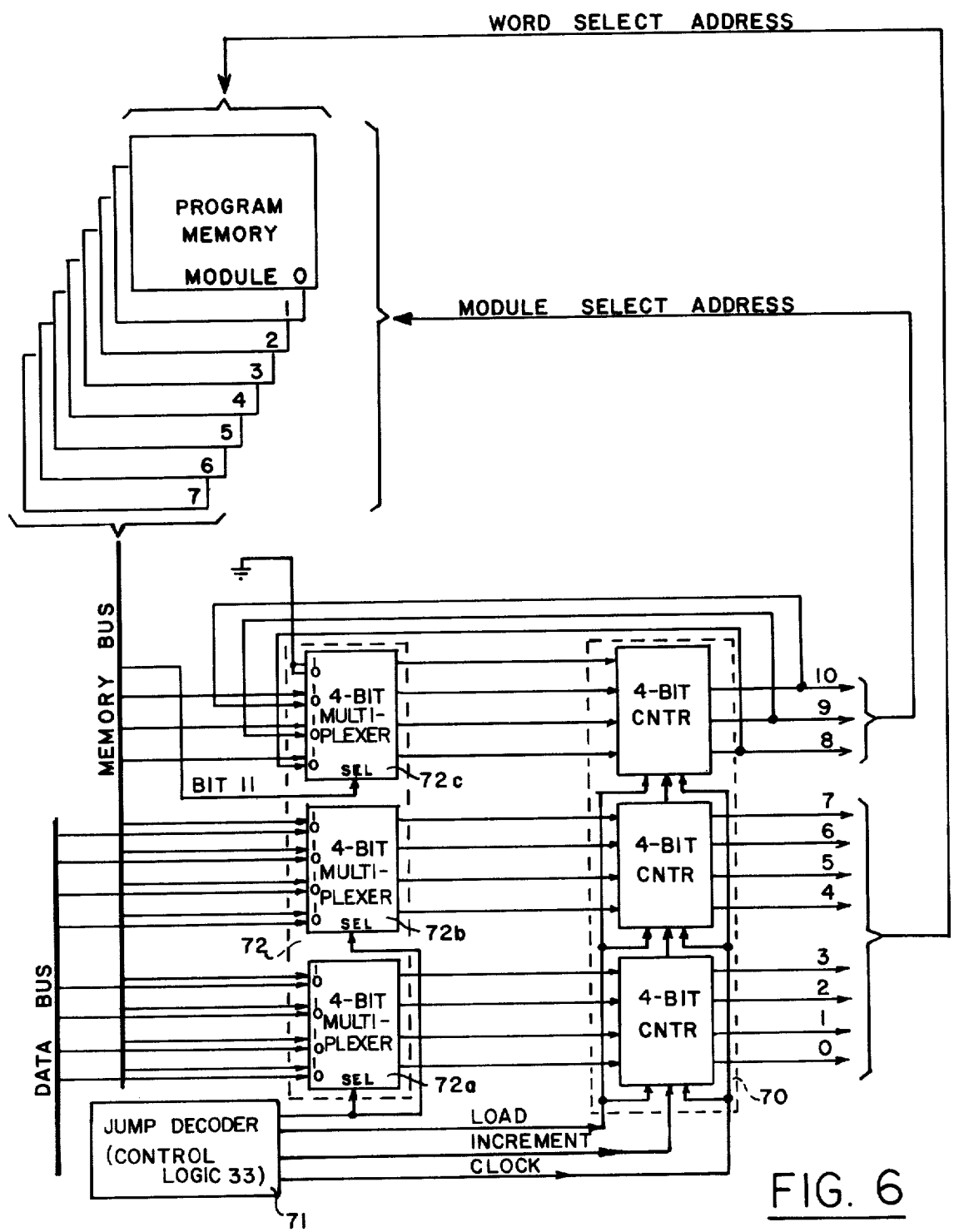
FIG. 6 is a schematic diagram illustrating the modular arrangement of a ROM program memory in the PCM shown in FIG. 2.

In the exemplary embodiment having a 12-bit address word, there may be eight ROM modules as shown schematically in FIG. 6. The first two module positions at octal addresses 0 and 1 are reserved for the control program, and the remaining six module positions at octal addresses 2 through 7 may be used for any protocol. A direct jump from the control routine to a specific address in another ROM module will cause the control program to branch to the starting address of the appropriate protocol in one of the other ROM modules. Execution of the instructions in that protocol (i.e., that modular ROM) is under control of the address counter 36 (FIG. 2) which is incremented upon executing each instruction. Any jump required within the protocol must be relative to the starting address of the protocol. Therefore, the address bits of the starting address in bit positions 8, 9 and 10 must be retained during each jump, except the last jump of the protocol which is a direct jump to the control routine in the first ROM module. To distinguish the two types of jump instructions in a protocol, the most significant position (bit 11) of each relative jump address is set equal to a logic 0, and for the direct jump address at the end of the protocol, it is set equal to a logic 1.

The address counter 36 is shown in greater detail in FIG. 6. It includes a counter 70, a jump decoder 71, and a multiplexer 72 comprised of three sets of 4-bit multiplexing gates 72a, 72b and 72c, each with a select terminal (SEL) for selecting parallel inputs at one of two sets of input terminals labeled "0" and "1." The input terminals labeled "1" and "0" of the 4-bit multiplexers 72a and 72b are selected to be either from the data bus under control of an instruction in the instruction register 35 (FIG. 2) or from the program memory for a jump instruction as decoded by the decoder 71 effectively operating on selected bits of a jump instruction in the register 35 (FIG. 2). The address counter 70 is thus loaded from the multiplexer 72. At all other times the address counter is incremented to specifiy the address of the next instruction. The 4-bit multiplexer 72c does not multiplex between the data bus and the program memory under control of the instruction decoder 71; it multiplexes between the output of the address counter and the program memory under control of the twelfth memory bit in bit position 11. When that bit is a bit 0, the selection is from the high order bits 8, 9 and 10 of the address counter and at all other times from the program memory. The twelfth bit (bit 11) of the memory address words is not otherwise used.

Each jump instruction read from a location in the program memory will have the address of the next instruction stored in location, N+1. Upon decoding the jump instruction read from memory, the mulitplexers 72a and 72b will load from the program memory regardless of the twelfth bit in bit position 11 of the jump address read from the location N+1, but the multiplexer 72c loads from the program memory only if bit 11 is a logic 1 for a direct jump to a specific (full) address anywhere in memory, and normally in one of the other ROM modules storing a protocol (routine) for a specific communication discipline. If bit 11 is a logic 0, the multiplexer 72c loads from the address counter. The multiplex control bit 11 read from location N+1 of a branch instruction is used as the select signal for the multiplexer 72c. It is normally set to logic 0 for all branch instructions in the control program stored in the first ROM module having the octal address 0, except in the case of branching to or from a protocol stored in any one of the other ROM modules having an octal address from 1 to 7. In that case the multiplex control bit of the jump address read from location N+1 is set to a logic level 1 to cause the multiplexers 72a, 72b and 72c to all load from the program memory. That affects a direct jump to or from a protocol. A jump from a protocol will always be back to the control program in the ROM module having the octal address 0. Bits 8, 9 and 10 of a branch address for an instruction to branch back to the control program will thus all be at the logic level 0 and bit 11 will be a logical 1.

From the foregoing, it is evident that all jump instructions must contain a logic 0 in the most significant bit position of the address of the next instruction if the jump is relative to the last address of a modular ROM loaded into the address counter. If the jump is to be a direct jump to a specific address anywhere in the program memory, the bit 11 is set to logic 1 in the specific address. That specific address will, of course, be the first instruction of a protocol in one of the other ROM modules when jumping from the control program in modules 0 and 1 to a protocol, and the appropriate location in the ROM modules containing the control program when jumping from a protocol back to the control program.

This use of bit 11 in a jump address permits every protocol to be programmed in a ROM module with all of its jump instructions relative to its first instructions so that it is not necessary to know in advance in which memory position the ROM module is to be plugged in, and to permit a direct jump back to the control program at the end of the protocol. It is then possible to select a ROM module preprogrammed with any one of an indefinite number of protocols for any position of the modules 2 through 7, in this exemplary case of using two ROM modules for the control program, and for the control program to select any one of the remaining protocols by scanning the terminals to which the channel DID lines are connected. Where only six different protocols are provided in separate ROM modules, as in the exemplary embodiment just described, only six terminals would be used and scanned. However, it should be recognized that the number of protocol ROM modules may be expanded to some larger number, such as 16, by simply increasing the length of an address word to 13 in which case the number of terminals could be increased to the maximum number of different protocols that could then be accommodated, namely 14. Thus, although particular embodiments of the invention have been described with only one or two modules for the control program and seven or six modules for protocols, it is evident that even three or more ROM modules could be used for the control program, leaving less ROM modules for protocols. But if a larger array of protocols is required for a greater number of different types of peripheral devices, the system could be implemented with a larger address word, as just noted, to accommodate more modules. However, it has been found that using two ROM modules for the control program and six ROM modules for the protocols is generally adequate for the usual installation.

It should be noted that the ROM program memory may be replaced with random access memory (RAM) modules to provide the capability of loading the control program from a data processor via the data bus, or externally via a communication channel. That would allow changing the control program under external program control, and would also allow debugging of protocols. Still other modifications and equivalents may readily occur to those skilled in the art. Consequently, it is intended that the claims be interpreted to cover such modifications and equivalents.

The embodiments of the invention in which an exclusive property or privilege is claimed are described as follows:

1. A communication control unit useful in a data processing system including a data processor, at least one interface adapter and a plurality of peripheral devices for communicating with said data processor through an interface adapter, said adapter having a plurality of addressable channels, each channel being dedicated to a separate peripheral device, each device being capable of handling messages in accordance with one of a number of distinct communication disciplines, said control unit comprising a programmable controller module for addressing said channels and handling messages between said channels and said data processor in accordance with the communication discipline of the device connected to the channel addressed, said programmable controller module having a plurality of input terminals, one discipline identification terminal for each of said plurality of distinct communication disciplines, and said interface adapter having means responsive to address signals from said programmable controller module for addressing said channels, each channel having a discipline identification line connected to one of said discipline identification terminals in accordance with the communication discipline of the device connected to the channel, and each channel further having means responsive to said addressing means for activating its discipline identification line, said programmable controller module including means for responding to an activated line to determine which communication discipline to use in handling a message between the addressed channel and said data processor.

2. A communication control unit as defined in claim 1 wherein said activating means of each channel for its discipline identification line is comprised of high impedance means for connecting said line to a voltage source of a predetermined level, and switching means responsive to said channel addressing means for selectively connecting said line to circuit ground when its channel is addressed.

3. A communication control unit as defined in claim 1 wherein said programmable control module includes a program memory means comprised of a plurality of memory modules for storing a control program in two parts, a first part for one level of control stored in a predetermined number of modules for addressing a number of device channels, and a second part for a second level of control which contains a plurality of protocols of discipline dependent routines to be used for servicing the different devices, each protocol of said second part being stored in a separate protocol module uniquely identified by a predetermined number of high order address bits, the remaining lower orders of an address identifying a location within a module, whereby said programmable controller module may address said channels under control of said first level of said control program and, upon addressing a selected channel and determining the communication discipline of the device to which the channel has been dedicated, may jump to a predetermined protocol module in said second level of said control program in accordance with which communication line has been activated.

4. A communication control unit as defined in claim 3 wherein said program memory means includes an address counter incremented in response to reading instruction words from a memory module in order to automatically execute instruction in sequence, multiplexing means for entering a jump address into said address counter from a memory module in response to jump instructions, and means for inhibiting said multiplexing means from entering into said address counter said predetermined number of high order address bits for all jump instructions within a protocol except the last, whereby a jump instruction from said first level of control to a particular protocol module in said second level of control may be effected, and from said particular protocol back to said first level of control only at the end of said particular protocol.

5. A communication control unit as defined in claim 4 wherein said inhibiting means is responsive to a high order bit in each jump address read from any module of said program memory means, said higher order bit being set to a predetermined binary logic value for all jump addresses of said first level of program control to permit jumping to any protocol module and set to the other binary logic value for all jump addresses of a protocol in said second level of program control except the last jump address of each protocol to inhibit jumping out of each protocol, said higher order bit of the last jump address of each protocol being set to said predetermined binary logic value to permit jumping out of the protocol module back to said first level of program control.

6. A communication control unit as defined in claim 5 wherein said multiplexing means is connected to reenter into said address counter said predetermined number of high order address bits in response to said higher order address bit of said other binary logic value from said program memory means whereby the address of the module storing the protocol to be used in servicing a channel is restored in said address counter in response to each jump instruction except the last.

7. A communication control unit, useful in a data processing system including a data processor and a plurality of peripheral devices, each for communicating with said data processor through a different channel in accordance with a different communication discipline, each channel having a discipline identification line, said communication control unit comprising:
a programmable controller module including:
program memory means including a plurality of locations each storing an instruction, with sequences of instructions forming a first level of program control common to all peripheral devices for producing device address signals for addressing said channels and a second level of program control consisting of protocols stored in separate modules of said program memory means, each protocol consisting of communication discipline dependent routines unique to one or more of said peripheral devices, each protocol being stored in a separate module uniquely identified by a predetermined number of high order bits of an address;
instruction register means;
program address counter means for identifying a location in said program memory means and for transferring the instruction stored therein to said instruction register means;
a read/write memory means for storing data;
a data bus comprised of parallel bit lines;
means responsive to instructions transferred to said instruction register means for operating on data either in said read/write memory means or appearing on said data bus;
a plurality of input terminals, each terminal being connected to a discipline identification line of a device communication channel in accordance with the discipline of a device to which the channel is dedicated, a direct memory access module means responsive to instructions transferred into said instruction register for selectively transferring data from said read/write memory means to said data processor and from said data processor to said read/write memory means; and an interface adapter means coupled between said programmable controller module and said peripheral devices for receiving data from and transmitting data to said peripheral devices through different channels, one channel being dedicated to each peripheral device, said interface adapter means including means responsive to said device address signals from said programmable controller module for addressing said channels one at a time, and means responsive to said addressing means for activating the discipline identification line of the channel addressed at any given time to identify the protocol to be used in servicing the device to which the addressed channel is dedicated.

8. A communication control unit as defined in claim 7 wherein said second level of program control consisting of communication protocols is stored in a plurality of memory modules, each protocol being stored in a separate module uniquely identified by a predetermined number of high order address bits, the remaining lower orders of an address identifying locations within the separate module, and wherein said program memory means includes:

an address counter incremented in response to reading instructions from a memory location in order to automatically execute instructions in sequence, multiplexing means for entering a jump address into said address counter from a memory module in response to jump instructions, and means for inhibiting said multiplexing means from entering into said address counter said predetermined number of high order address bits for all jump instructions within a protocol except the last, whereby a jump instruction from said first level of control to a particular protocol in said second level of control may be effected, and from said particular protocol back to said first level of control only at the end of said particular protocol.

9. A programmable controller module as defined in claim 8 wherein said inhibiting means is responsive to a high order bit in each jump address read from any module of said program memory means, said higher order bit being set to a predetermined binary logic value for all jump addresses of said first level of program control to permit jumping to any protocol module and set to the other binary logic value for all jump addresses of a protocol in said second level of program control except the last jump address of each protocol to inhibit jumping out of each protocol module, said higher order bit of the last jump address of each protocol being set to said predetermined binary logic value to permit jumping out of the protocol module back to said first level of program control.

10. A programmable controller module for servicing a plurality of peripheral devices, said module having a plurality of device identification input terminals, each device for communicating in accordance with only one of a predetermined number of communication disciplines through a separate channel each channel having a discipline identification line, and each channel being addressable by said controller module, said controller module including a program memory means comprised of a plurality of memory modules for storing a control program arranged in two parts, each part having routines for providing a level of control for said devices, a first part stored in a predetermined number of memory modules for addressing any one of said device channels, and a second part having routines for servicing a number of device channels, routines of said second part being divided into a plurality of protocals, each protocol being comprised of discipline dependent routines to be used for servicing the different devices, and each protocol being stored in a separate one of said memory modules uniquely identified by a predetermined number of high order address bits, the remaining lower orders of an address identifying locations within a separate module, each device identification input terminal being connected to a discipline identification line of a channel in accordance with the discipline of a device to which the channel is dedicated, means responsive to said first part of said control program for addressing said channels one at a time, and means responsive to said addressing means for activating the discipline identification line of the channel, said programmable controller module including means responsive to said activated line for identifying the protocol to be used in servicing the device to which the addressed channel is dedicated.

11. A programmable controller module as defined in claim 10 wherein said program memory includes an address counter incremented in response to reading instruction words from a memory module in order to automatically execute instructions in sequence, multiplexing means for entering a jump address into said address counter from a memory module in response to jump instructions, and means for inhibiting said multiplexing means from entering into said address counter said predetermined number of high order address bits for all jump instructions within a protocol except the last, whereby a jump instruction from said first part constituting one level of control to a particular protocol in said second part constituting another level of control may be effected, and from said particular protocol back to said first part for said one level of control only at the end of said particular protocol.

12. A programmable controller module as defined in claim 11 wherein said inhibiting means is responsive to a high order bit in each jump address read from any module of said program memory means, said higher order bit being set to a predetermined binary logic value for all jump addresses of said first level of program control to permit jumping to any protocol module and set to the other binary logic value for all jump addresses of a protocol in said second level of program control except the last jump address of each protocol to inhibit jumping out of each protocol module, said higher order bit of the last jump address of each protocol being set to said predetermined binary logic value to permit jumping out of the protocol module back to said first level of program control.

* * * * *